(12) United States Patent
Clark

(10) Patent No.: US 7,805,625 B1
(45) Date of Patent: *Sep. 28, 2010

(54) POWER SUPPLY DELIVERY FOR LEAKAGE SUPPRESSION MODES

(75) Inventor: Lawrence T. Clark, Phoenix, AZ (US)

(73) Assignee: Marvell International Ltd., Hamilton (BM)

(*) Notice: Subject to any disclaimer, the term of this patent is extended or adjusted under 35 U.S.C. 154(b) by 43 days.

This patent is subject to a terminal disclaimer.

(21) Appl. No.: 12/284,524

(22) Filed: Sep. 23, 2008

Related U.S. Application Data

(63) Continuation of application No. 10/620,470, filed on Jul. 15, 2003, now Pat. No. 7,428,649.

(51) Int. Cl.
*G06F 1/30* (2006.01)

(52) U.S. Cl. .................... 713/323; 713/330; 365/229

(58) Field of Classification Search .............. 713/323, 713/330; 365/229
See application file for complete search history.

(56) References Cited

U.S. PATENT DOCUMENTS

| | | | |
|---|---|---|---|
| 4,363,978 A | 12/1982 | Heimbigner | |
| 4,654,829 A | 3/1987 | Jiang et al. | |
| 5,568,085 A * | 10/1996 | Eitan et al. | 327/546 |
| 5,678,049 A | 10/1997 | Massie | |
| 5,867,719 A | 2/1999 | Harris et al. | |
| 5,999,386 A | 12/1999 | Anderson et al. | |
| 6,064,223 A | 5/2000 | Lu et al. | |
| 6,092,207 A | 7/2000 | Kolinski et al. | |
| 6,308,278 B1 | 10/2001 | Khouli et al. | |
| 6,484,265 B2 | 11/2002 | Borkar et al. | |
| 6,574,577 B2 | 6/2003 | Stapleton et al. | |
| 6,754,692 B2 | 6/2004 | Cruz | |
| 7,058,834 B2 | 6/2006 | Woods et al. | |
| 7,113,430 B2 * | 9/2006 | Hoefler et al. | 365/185.23 |

OTHER PUBLICATIONS

USPTO Office Action mailed Nov. 2, 2006 for U.S. Appl. No. 10/620,470 filed Jul. 15, 2003.
Amendment filed Feb. 2, 2007 in response to USPTO Non-Final Office Action mailed Nov. 2, 2006 for U.S. Appl. No. 10/620,470, filed Jul. 15, 2003.
USPTO Office Action mailed May 3, 2007 for U.S. Appl. No. 10/620,470 filed Jul. 15, 2003.
Amendment and Petition for Extension of Time filed Aug. 29, 2007 in response to USPTO Non-Final Office Action mailed May 3, 2007 for U.S. Appl. No. 10/620,470, filed Jul. 15, 2003.
USPTO Office Action mailed Nov. 16, 2007 for U.S. Appl. No. 10/620,470 filed Jul. 15, 2003.
Amendment filed Feb. 19, 2008 in response to USPTO Final Office Action mailed Nov. 16, 2007 for U.S. Appl. No. 10/620,470, filed Jul. 15, 2003.

* cited by examiner

*Primary Examiner*—Thuan N Du

(57) ABSTRACT

A method includes providing power to on-die combinatorial circuitry of an integrated circuit (IC) from an external power supply regulator during an active mode of the IC. A state of the on-die combinatorial circuitry of the IC is moved into on-die storage of the IC. Power to the on-die combinational circuitry is disabled during a low power mode of the IC by disrupting power supplied from the external power supply regulator to the IC. A power feedback signal from an internal portion of the IC is provided to the external power supply regulator.

10 Claims, 3 Drawing Sheets

POWER SUPPLY DELIVERY FOR LEAKAGE SUPPRESSION MODES

This application is a continuation of U.S. patent application Ser. No. 10/620,470, filed Jul. 15, 2003. The disclosure of the above application is incorporated herein by reference in its entirety.

As memory arrays and other circuit blocks are embedded into the microprocessors that are used in a diversity of consumer products, the trend toward portable products suggests conserving power by lowering the operating voltage of the electronic devices. Additionally, process scaling is used to reduce the area needed for the memory array and logic functions in an effort to lower the product costs. However, process scaling poses problems since scaling oxide thickness and channel lengths may result in high leakage currents and consequent high standby power consumption. As the process is scaled, of particular importance is the thin gate-oxide of transistors used in memories, latches and logic used to store state values since leakage may be mitigated in other circuits by collapsing the supply voltages.

The thin gate-oxides may cause large drain-to-source currents and gate leakage currents that may be appreciable during a standby mode. Thus, there is a continuing need for better ways to provide flexibility for operating a microprocessor, memory or other circuit having thin gate-oxides while preserving low standby currents.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
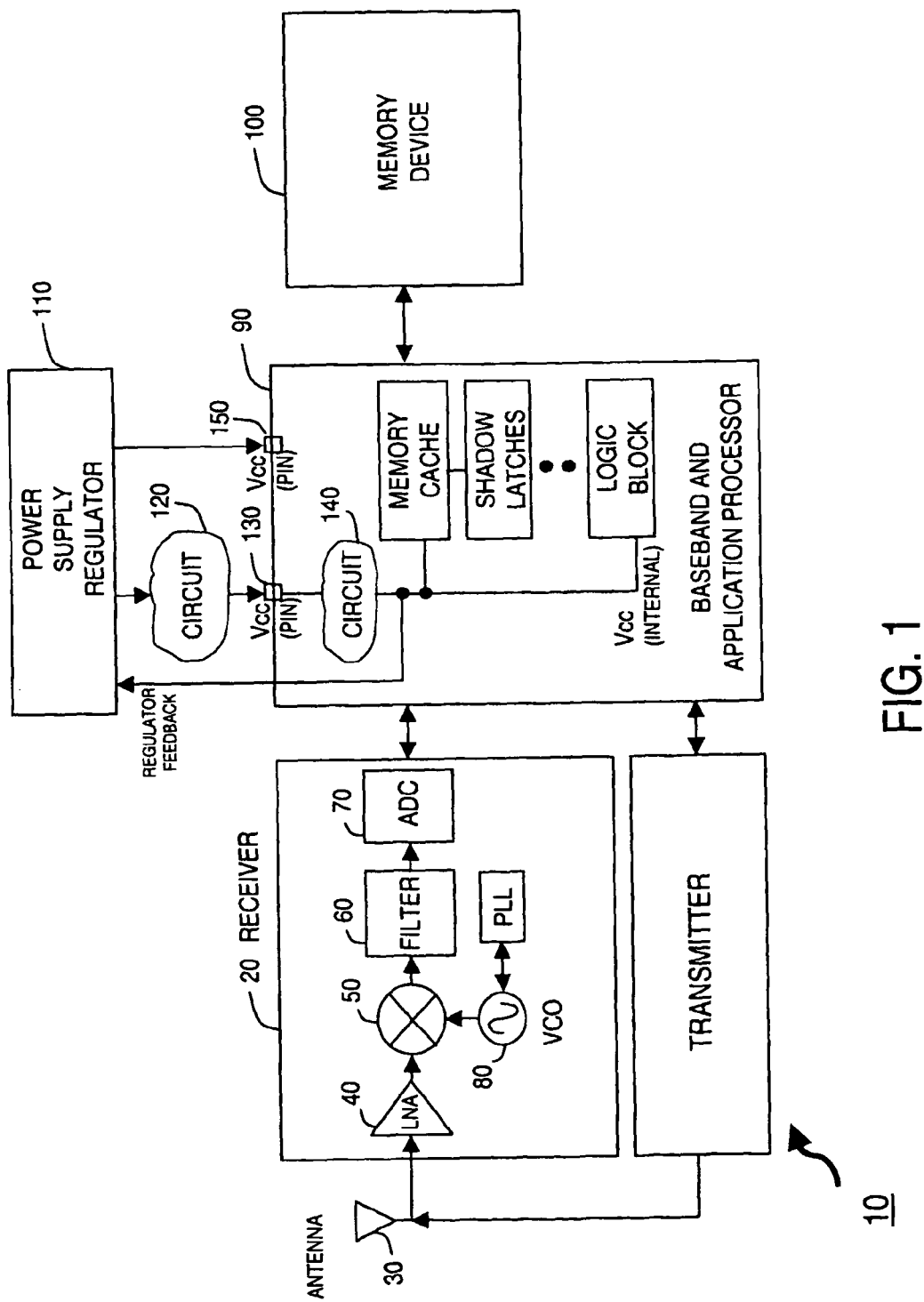
FIG. 1 illustrates features of the present invention incorporated into a wireless communications device.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The architecture shown in FIG. 1 for wireless communications device 10 includes features of the present invention that may be used in a product designed for low power. The simplified diagram for a hand-held wireless communications device 10 shows a super heterodyne receiver 20 that receives a modulated signal from an antenna 30, although this is not a limitation of the present invention. Alternate embodiments may include a direct conversion receiver. Further embodiments may incorporate multiple antennas for diversity.

A Low Noise Amplifier (LNA) 40 amplifies the signal received from antenna 30 and a mixer circuit 50 "mixes" a tone generated by an oscillator circuit with the received signal for down-converting the carrier frequency of the modulated signal to a baseband frequency. The baseband signal may be filtered through a filter 60 and converted to a digital value by an Analog-To-Digital Converter (ADC) 70. A baseband and application processor 90 is connected to the transceiver to provide, in general, the digital processing of the received data within communications device 10. Receiver 20 and associated analog circuitry may be embedded with processor 90 as a mixed-mode integrated circuit. Alternatively, receiver 20 may be incorporated as a stand-alone Radio Frequency (RF) integrated circuit that provides processor 90 with baseband signals.

The architecture presented for wireless communications device 10 may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in laptop computers, smart phones, communicators and Personal Digital Assistants (PDAs), medical or biotech equipment, automotive safety and protective equipment, automotive infotainment products, and entertainment centers and multimedia networking systems that provide streaming audio and video applications in the home. However, it should be understood that the scope of the present invention is not limited to these examples.

A memory device 100 may be connected to processor 90 to store data and/or instructions used by processor 90. In some embodiments, memory device 100 may be a volatile memory such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In alternate embodiments, the memory devices may be nonvolatile memories such as, for example, an Electrically Programmable Read-Only Memory (EPROM), an Electrically Erasable and Programmable Read Only Memory (EEPROM), a flash memory (NAND or NOR type, including multiple bits per cell), a Ferroelectric Random Access Memory (FRAM), a Polymer Ferroelectric Random Access Memory (PFRAM), a Magnetic Random Access Memory (MRAM), an Ovonics Unified Memory (OUM), a disk memory such as, for example, an electromechanical hard disk, an optical disk, a magnetic disk, or any other device capable of storing instructions and/or data. However, it should be understood that the scope of the present invention is not limited to these examples.

Processor 90 includes a $V_{CC}$ pin 130 for receiving a voltage potential from a power supply regulator 110. The conditioned and regulated voltage potential may be passed through circuits 120 and 140 to provide a high quality internal $V_{CC}$ voltage potential used by circuitry such as, for example, a memory cache, shadow latches, and other state-retentive logic blocks. As shown, the power supply circuitry may be off-die to allow improved power performance such as a low IR drop, reduced ripple, smaller die size and lower product costs. Circuit 140 provides external power supply clamp transistors that gate the power supply to limit standby power in the low standby power mode. The features of the present invention provide a circuit technique for state elements to enter and exit low standby leakage current modes on high performance and high leakage processes. Thus, integrated circuit state may be moved into an on-die low leakage storage, and then, power to combinational circuitry may be disabled externally in accordance with features of the present invention. While circuits 120 and/or 140 may disable or collapse the voltage potential supplied at pin 130 to the combinational circuitry, the voltage potential supplied to pin 150 may provide power to the low leakage memory or shadow latches.

Figure 2:
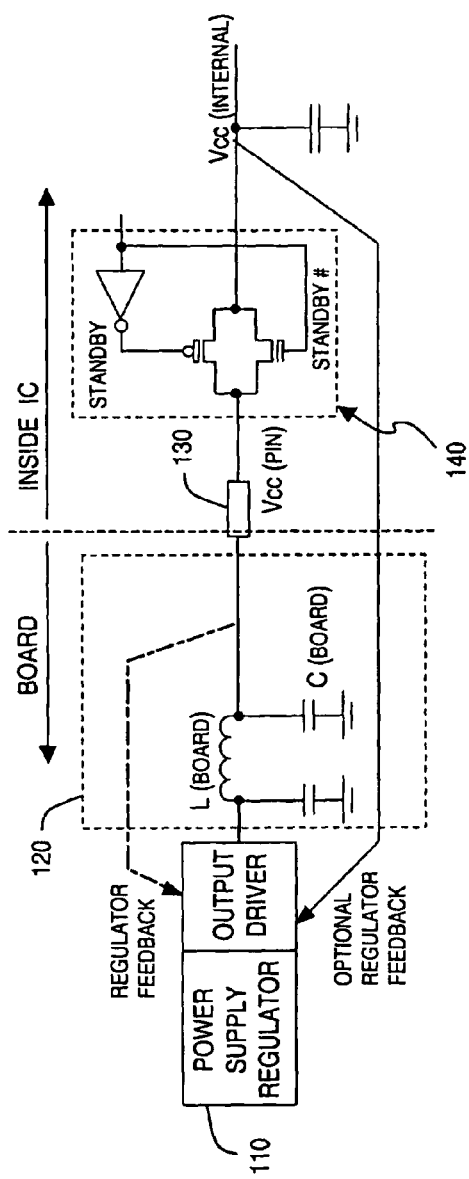
FIG. 2 illustrates an embodiment using power supply clamp transistors for gating the power supply to limit standby power in accordance with the present invention.

FIG. 2 illustrates power supply regulator 110 generating a voltage potential that is provided via a trace on a circuit board to a $V_{CC}$ pin 130 of an integrated circuit. The circuit board trace includes an inductance L and capacitors C, along with resistive impedance from the metal trace that provides an IR voltage drop. The on-die clamps 140 may be gated off when the integrated circuit is selected to operate in a low power mode. By way of example, the integrated circuit may be processor 90 that operates in an "ultra-drowsy" mode where the logical state of the integrated circuit is retained in low leakage devices while the supply $V_{CC}$ (internal) is allowed to collapse. On the other hand, the on-die clamps 140 are gated on when processor 90 operates in the active mode. In one embodiment a REGULATOR FEEDBACK signal may be supplied from device pin 130 back to power supply regulator 110. However, in this embodiment the IR drop through the CMOS clamps 140 is not compensated. In another embodiment, an OPTIONAL REGULATOR FEEDBACK signal may be supplied from an internal $V_{CC}$ supply to provide a Kelvin sense that compensates for the IR drop. Note that when on-die clamps 140 are cutoff the regulator may be disabled and switch to receiving feedback at pin 130.

Although only one $V_{CC}$ pin 130 is illustrated in the figure it should be understood that supply regulator 110 may supply power to multiple $V_{CC}$ pins 130, with the various $V_{CC}$ pins connected to separate blocks within the integrated circuit. For instance, one $V_{CC}$ pin 130 may be connected to an internal arithmetic logic unit, another $V_{CC}$ pin 130 may be connected to the input/output (I/O) pad ring, while yet another $V_{CC}$ pin 130 may be connected to the main clock generator block, although these examples do not limit the scope of the present invention. Further, in addition to the $V_{CC}$ pins 130 that may be connected to the various blocks within the integrated circuit and gated on and off, supply regulator 110 may supply a non-gated voltage potential through a separate pin 150 (see FIG. 1) to "shadow" latches for state retention.

Figure 3:
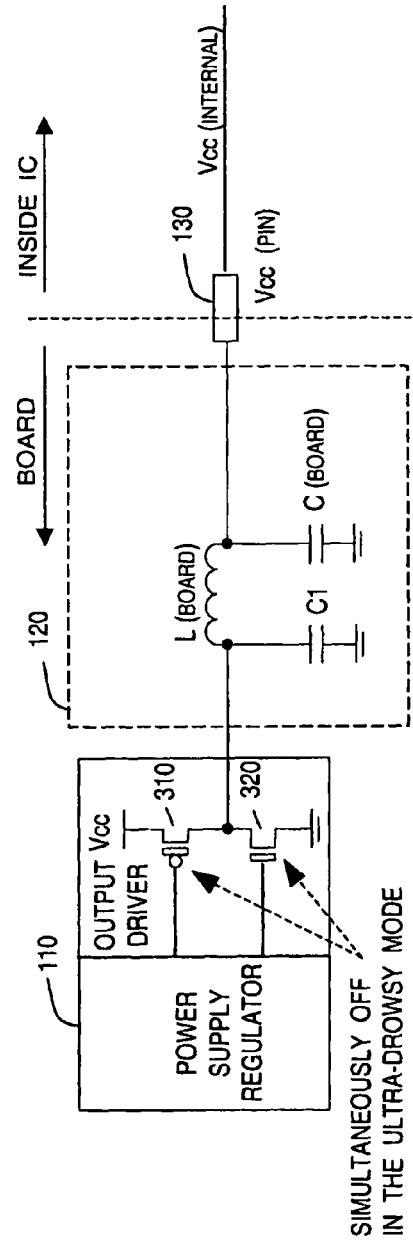
FIG. 3 illustrates a tri-state buffer for controlling the power supplied to an integrated circuit.

FIG. 3 illustrates features of the present invention for controlling the power of an integrated circuit. This embodiment includes a P-channel transistor 310 and an N-channel transistor 320 at the output of power supply regulator 110 that may be tri-stated as the integrated circuit enters the low power state. It is undesirable to force power supply regulator 110 to drive the output to zero volts on the $V_{CC}$ supply in the low power state since the decoupling capacitances (the capacitors on the board) would be discharged, causing a substantial energy dissipation. The board capacitance is typically quite high, possibly 100's of microfarads, in order to limit the supply ripple and provide good AC load line characteristics. Accordingly, P-channel transistor 310 and N-channel transistor 320 are tri-stated and the energy stored by the capacitors is dissipated via core leakage. Since leakage dissipates the capacitor charge slowly, the core may return quickly from the low power state because less charge (energy) needs to be delivered to $V_{CC}$ to restore its voltage and allow operation if charge remains on the capacitors. It may also be possible to respond to an interrupt or other event at low voltage before restoring a full supply voltage for high-speed operation.

Note that it is inherently dangerous to open-circuit inductors, as high voltages may occur that may be deleterious to the integrated circuit. Consequently, the operation must take place at a carefully chosen time and operating point and the control laws of the feedback regulator must be properly accounted for. It should be noted that many other regulator configurations are possible and may also be used effectively without limiting features of the present invention.

Figure 4:
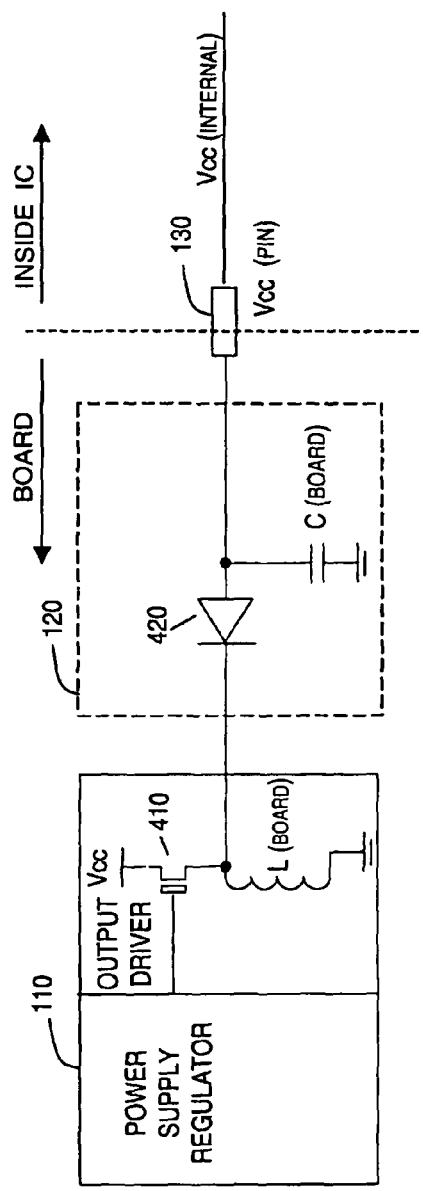
FIG. 4 illustrates a transistor and diode for controlling the power supplied to an integrated circuit.

FIG. 4 is another embodiment that illustrates features of the present invention for controlling the power of an integrated circuit. In this embodiment an off-die N-channel transistor 410 is connected to the output of power supply regulator 110 for supplying current to a node clamped by a diode 420. A voltage potential is supplied to $V_{CC}$ pin 130 from the common connection of the source of transistor 410 and the cathode of diode 420. Transistor 410 may be gated off and the energy stored by the capacitors on the board may be dissipated via core leakage.

Figure 5:
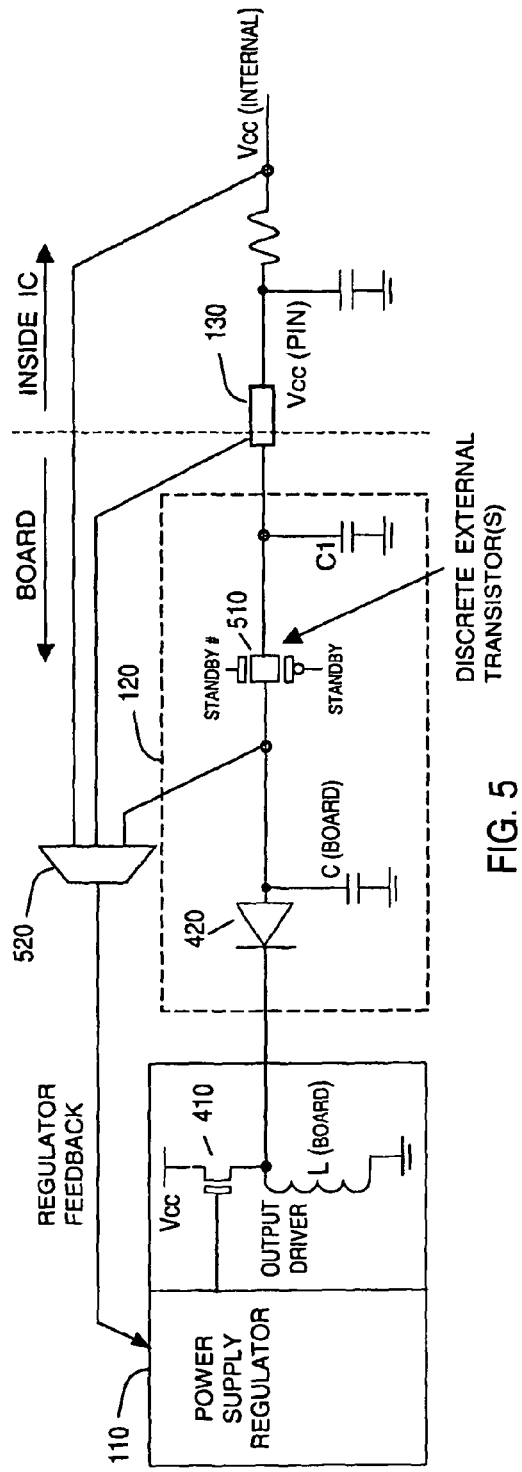
FIG. 5 is a schematic showing external power supply clamp transistors for gating the power supply to limit standby power in an integrated circuit in accordance with the present invention.

FIG. 5 is a schematic showing external power supply clamp transistors 510 for gating the power supply to limit standby power in an integrated circuit in accordance with the present invention. In this embodiment, external power supply clamp transistor(s) 510 are placed between power supply regulator 110 and the integrated circuit. Although clamp transistor(s) 510 are illustrated as complimentary devices that may handle additional power by the parallel transistors, it should be noted that some embodiments may use a single NMOS device for the clamp.

As before, supply regulator 110 may provide multiple, separate core supplies that may be externally clamped. When power supply regulator 110 supplies multiple core supplies though multiple clamps, a switching network may determine the feedback signal. The feedback signal, for example, may be determined by a supply which is on initially, or alternatively, by a supply which was on last. The feedback signal supplied to power supply regulator 110 may be transferred through a multiplexer 520, with input signals received from a $V_{CC}$ located internal on the core, the $V_{CC}$ pin 130, or external to the integrated circuit. Multiplexer 520 may be physically located on the board, in the integrated circuit or in power supply regulator 110. Note that capacitance C1 on the inside of clamp 510 may be small, perhaps zero, so that the energy cost of a short standby interval is small and perhaps negligible. Since the feedback network does not carry substantial current, a higher resistance from the metal trace line can be tolerated. Again, the switching must obey the regulator control laws to avoid instability.

By now it should be apparent that a method and circuitry have been presented for gating the power supply to limit standby power in an integrated circuit. The IR drop through the clamps and trace metal may be compensated to improve power performance and allow the power supply regulator to supply the best quality power signals possible.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method, comprising:
   providing power to on-die combinatorial circuitry of an integrated circuit (IC) from an external power supply regulator during an active mode of the IC;
   moving a state of the on-die combinatorial circuitry of the IC into on-die storage of the IC;
   externally disabling power to the on-die combinational circuitry during a low power mode of the IC by disrupting power supplied from the external power supply regulator to the IC; and
   providing a power feedback signal from an internal portion of the IC to the external power supply regulator, wherein the power feedback signal varies according to input power.

2. The method of claim 1, wherein disabling power further includes tri-stating an output of the external power supply regulator.

3. The method of claim 1, wherein disabling power further includes gating an off-die clamp to disrupt power supplied from the external power supply regulator to the IC.

4. The method of claim 1, wherein disrupting the power further includes gating an on-die clamp.

5. The method of claim 1, further including reapplying power after the IC receives an interrupt.

6. A method, comprising:
   providing power to first circuits of an integrated circuit (IC) from an external power supply during an active mode of the IC,
   wherein the first circuits have a first operating speed and a first leakage rate;
   copying a state of the first circuits of the IC to second circuits of the IC,
   wherein the second circuits have at least one of a second operating speed that less than the first operating speed and a second leakage rate that is less than the first leakage rate;
   externally disabling power to the first circuits during a low power mode of the IC by disrupting power supplied from the external power supply to the IC; and
   providing a power feedback signal from an internal portion of the IC to the external power supply, wherein the power feedback signal varies according to input power.

7. The method of claim 6, wherein disabling power further includes tri-stating an output of the external power supply.

8. The method of claim 6, wherein disabling power further includes gating an off-die clamp to disrupt power supplied from the external power supply.

9. The method of claim 6, wherein disrupting the power further includes gating an on-die clamp.

10. The method of claim 6, further including reapplying power after the IC receives an interrupt.

* * * * *